Oct. 27, 1964     R. H. SHENK ETAL     3,153,921
SEALING MEANS AND FLEXIBLE COUPLING IN COMBINATION THEREWITH
Filed April 30, 1962
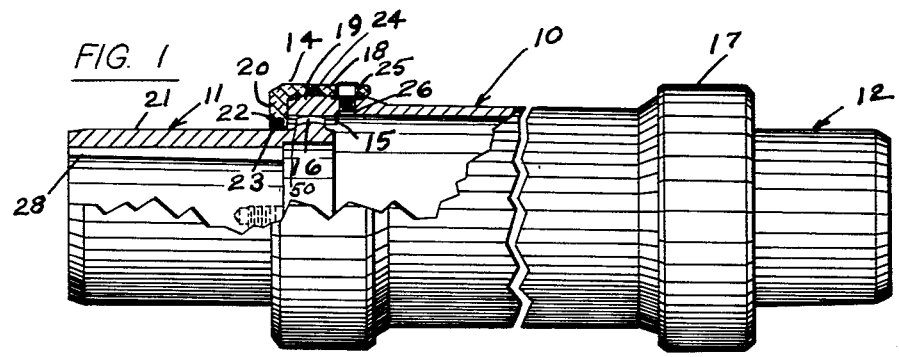
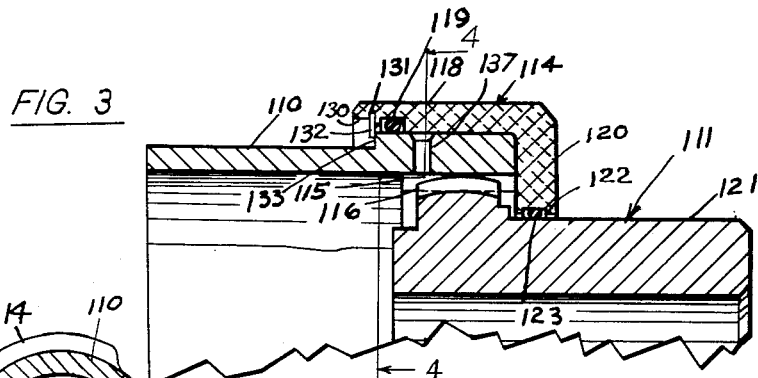
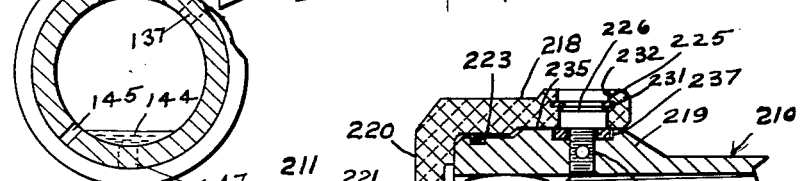
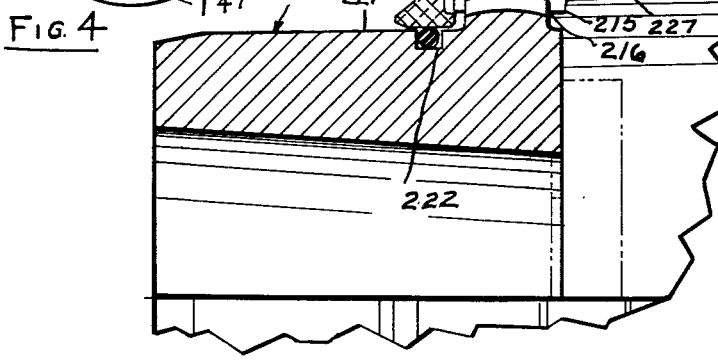
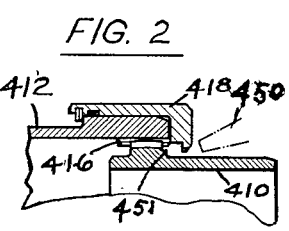
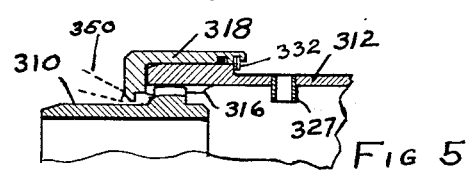
INVENTORS
ROBERT H. SHENK
JOHN J. KANE
LOUIS H. SAHLMANN
BY Charles L. Lonesback
Attorney United States Patent Office 3,153,921
Patented Oct. 27, 1964

3,153,921
SEALING MEANS AND FLEXIBLE COUPLING IN COMBINATION THEREWITH
Robert H. Shenk, John J. Kane, and Louis H. Sahlmann, Erie, Pa., assignors to Zurn Industries, Inc., Erie, Pa., a corporation of Pennsylvania
Filed Apr. 30, 1962, Ser. No. 191,097
7 Claims. (Cl. 64—9)

This invention relates to couplings and, more particularly, to flexible couplings of the gear type.

Couplings of the general type shown in Patent No. 2,510,414 encounter difficulties when the snap ring is to be removed, especially when used in couplings having a "bellmouth housing" over the seal which extends over the hub almost to the end of the continuous sleeve.

To eliminate the difficulty of removing the snap ring, the idea disclosed in the embodiment of the invention shown in FIG. 1 has been conceived. This constitutes an aluminum ring containing a flexible O-ring seal as well as a static O-ring. The cap is secured in position by two combination lubricant supply and locking pins.

The sealing arrangement in the embodiment of the invention shown in FIG. 2 is similar to the design shown in FIG. 1 except that the combination locking pin and lubricant plug is designed such that the locking pin is secured in its hole by a small snap ring located in a groove in the hole in the end cap above the pin. This requires special tools for disassembly; however, it insures that the pin will not come out and thus constitutes an improvement over the prior art.

The embodiment shown in FIG. 3, like FIG. 1, provides a coupling which is an improvement over the art. This coupling has a ring which eliminates the combination locking pins and lubricant plugs since the end cap has an inner snap ring groove and the sleeve has a step below the snap ring groove in the inner periphery. Thus, the sleeve and the end cap are secured by the snap ring. Oil is added through a single lubricant hole by shifting the seal and end cap in an axial outward direction until the lubricant hole is exposed. In order to balance the coupling, a counterbalance hole is drilled in the opposite side of the coupling from the lubricant hole. This counterbalance hole is located toward the end of the sleeve from the lubricant hole in a position where lubricant will not be lost through the counterbalance hole when the end of the sleeve is moved past the lubricant hole.

It is, accordingly, an object of the present invention to provide an improved coupling.

Another object of the invention is to provide an improved combination flexible coupling and seal.

A further object of the invention is to provide a sealing arrangement which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a view partly in cross section of a coupling according to the invention;

FIG. 2 is a partial broken away view in cross section of another embodiment of the invention;

FIG. 3 is a view similar to FIG. 2 of yet another embodiment of the invention;

FIG. 4 is a cross sectional view taken on line 4—4 of FIG. 3 with the sleeve slid off of the hub for lubricating;

FIG. 5 is a view of another embodiment of the invention; and

FIG. 6 is a view of still yet another embodiment of the invention.

Now with more particular reference to the drawing, the coupling shown in FIG. 1 has a sleeve 10 with hub members 11 and 12 received therein and held in place by means of sealing rings 14 and 17.

The sleeve 10 is a hollow one piece member cylindrical in shape. The material adjacent the ends is considerably thicker than the intermediate material. This makes a rigid support for integral teeth 15 which extend inwardly on the inner periphery adjacent the ends. A threaded hole is provided at the thickened end to receive a bolt 26. Such a hole is formed at each end of the coupling just inward of the teeth 15.

An enlarged diameter thickened end portion 19 at each end of the sleeve 10 has a finished outside surface which engages an O-shaped washer 24 to form a seal between the said outside surface and the groove in the sealing ring which receives the O-ring.

The sealing ring has an annular portion 18 with an internal cylindrical surface which receives the enlarged portion 19 of the sleeve and an inwardly directed flange portion 20 which overlies the end of the sleeve 10 and overlies the ends of teeth 16. The flange portion 20 has a groove 22 in the inner periphery thereof which receives an O-shaped sealing ring 23. The sealing ring 23 makes sealing engagement with the outside cylindrical surface 21 of the hub members 11 and 12.

The sealing ring 14 has the hole 25 therein which receives the head of the bolt 26. The bolt 26 is threadably received in a threaded hole in the thickened end of the sleeve 10 and, therefore, holds the sealing ring in position.

The hub members 11 and 12 are generally hollow and cylindrical. Each hub member has external crowned teeth 16 which mate with the teeth 15. Internal key slots 28 are provided for keying suitable shafts to the hub members 11 and 12. A shoulder will engage a shoulder 50, if it slides too far out, to protect the ends of the hub teeth from striking the ring.

To disassemble the hub members 11 and 12 from the sleeve 10, it is merely necessary to remove the bolts 26 from their holes. Then the rings 14 and 17 can be slid outwardly. This will allow the teeth 16 of the hub members to slide out of engagement with the internal teeth 15 and, therefore, the hub members can be removed.

If it is desired to lubricate the coupling, it is merely necessary to remove one of the bolts 26. Then lubricant can be injected through the hole in the sealing ring 23 and the hole in the sleeve aligned therewith. The ring 23 could be in a groove in the hub as shown in FIG. 4 and washer 24 could be in the end portion 19 as shown in FIG. 3.

In the embodiment of the invention shown in FIG. 3, a sleeve 110 is similar to sleeve 10 in FIG. 1. The sleeve receives hubs 111. The sleeve has internal teeth 115 which mate with crowned teeth 16.

A sealing ring 114 has an anular portion 118 extending generally parallel to the sleeve 110 and to this annular portion is attached an inwardly directed flange 120 having an internal groove 122 therein. The internal groove 122 receives an O-shaped washer 123 which forms sealing engagement with an outer peripheral surface 121 of the hub 111.

The annular portion 118 has an internal peripheral groove which receives a sealing ring 119 and a groove 131 in a counterbore 130 receives a snap ring 132 which engages a flange 133 to prevent the hub from being removed from the sleeve.

A second counterbalance hole 147 can be formed in the sleeve 110 diametrically opposite hole 137. This hole can be outward toward the hub 111 so that when the sealing ring 114 is slid outwardly to expose the hole 137, the counterbalance hole 145 will, at this point, still be covered by the part of the ring exposed. Thus, the lubricant in the coupling will not drain out of this hole while lubricant may be added through the hole 137.

The hole 145 may be drilled in the sleeve 110 on a central axis disposed diametrically opposite the axis of the hole 137 and on the same circumferential line as hole 137. Thus, when the ring 114 is moved out for lubrication and lubricant is added, the level of lubricant indicated at 144 will rise until it reaches the level of the hole 145 as shown in FIG. 4. Then it will run out hole 145, indicating that the lubricant has reached the proper level.

In the embodiment of the invention shown in FIG. 2, a hollow sleeve 210 similar to the sleeve 10 of FIG. 1 has inwardly directed teeth 215 which mate with crowned teeth 216 on a hub 211. The sleeve 210 has an enlarged diameter or end thickened portion 219 thereon which slidably engages a sealing ring 218. The sealing ring 218 has an inwardly directed annular flange 220 which overlies the end of the sleeve 210 and extends downwardly and terminates adjacent the outer periphery 221 of the hub.

The outer periphery 221 of the hub 211 has a groove 222 therein which receives an O-shaped sealing washer as shown. The O-shaped sealing washer engages the inwardly directed surface of the flange 220 which is enlarged in an axial direction as shown and thereby forms a seal between the outer periphery of the hub 211 and the inner surface of the sealing ring.

An outwardly directed O-ring groove 223 in the thickened part of the hub 211 receives an O-ring as shown which forms a sealing arrangement between the sleeve and the sealing ring. The sealing ring has a bore 225 therein which receives the head of a stud 226. The stud itself threadably engages a hole 227 in the thickened portion 219 of the sleeve 210. A snap ring 231 is supported in an internal groove in a bore 232 and the inner annular half of this snap ring overlies the head of the stud 226. The sleeve 210 has an enlarged band 235 which can have metal removed by drilling suitable blind holes therein to balance the coupling. A suitable washer 237 may be supported in a counterbore of the hole 227 to rest against the head of the stud 226.

In order to lubricate the coupling, the snap ring 231 can be removed and, thence, the stud 226 may be removed with a suitable screw driver or wrench, thus exposing the lubricant hole. This also allows the sealing ring 218 to be slid outwardly to allow the hub to be removed from the sleeve.

In the embodiment of the invention shown in FIG. 5, a hub 310 has external teeth thereon which engage internal teeth 316 on a sleeve 312. A suitable ring 318 similar to the ring in FIG. 1 is provided to hold the hub 310 on the sleeve. Inwardly extending cylindrical members 327 are fitted in holes in the outside of the sleeve and these members form, in effect, stand pipes. Lubricant may be fed to the coupling by a jet 350 to the periphery of the coupling by centrifugal force and will build up around the sides of the stand pipes when the coupling is running. No seal is provided between the hub and ring end so lubricant can readily enter. Thus, the lubricant will flow in through the gear teeth for continuous lubrication of the coupling. The height of lubricant in the coupling will be limited by the height of the stand pipe since if it gets deeper than the stand pipe, it will overflow and flow out the members or pipes 327.

The ring 318 is held in place by a snap ring 332 which rests in a groove in the ring 318 and overlies the thick end of the sleeve 312 as shown.

The embodiment of the invention shown in FIG. 6 discloses an externally toothed hub 410 received in an internally toothed sleeve 412 generally similar to the coupling shown in FIGS. 1 to 5. The coupling of FIG. 6 is shown, however, with a continuous lubrication system which could be a nozzle 450 for projecting lubricant against the ends of the teeth. The lubricant for the nozzle 450 can flow between the teeth into the sleeve and out between the teeth on the other end for continuous lubrication. A shoulder 451 protects the ends of the hub teeth from striking the end of the ring.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A flexible shaft coupling of the self-aligning gear type comprising a pair of complementary shaft end hubs each having a collar with gear teeth on the adjacent ends of said hubs, a one piece cylindrical sleeve having internal gear teeth extending lengthwise over and in engagement with the gear teeth on both said hubs, a sealing ring supported on the end of said sleeve, said sealing ring having an inwardly directed surface slidingly engaging an outwardly directed surface on the ends of said sleeve, said sealing ring having an inwardly directed flange portion terminating adjacent the outside surfaces of said hubs, an O-ring made of flexible material disposed between said inwardly directed flange and said hubs forming sealing engagement therewith, an O-shaped washer making sealing engagement between the outer surface of said sleeve and the inner surface of said sealing ring, means to hold said sealing ring in position on said sleeve, a lubricant hole in said sleeve under said sealing ring, said means for holding said sealing ring on said sleeve comprising an enlarged part on said sleeve defining an annular shoulder spaced inwardly from the end thereof, a counterbore in said ring, a groove inside said counterbore, and a snap ring in said groove in said sealing ring, said snap ring overlying said shoulder on said sleeve whereby said ring is held against sliding movement on said sleeve.

2. The coupling recited in claim 1 wherein said lubricant hole is disposed under said sealing ring and outward toward the end of said sleeve from said shoulder, said sealing ring being slidable outwardly toward the end of said sleeve when said snap ring is removed whereby said lubricant hole may be exposed.

3. The coupling recited in claim 2 wherein a counterbalance hole is disposed in said sleeve diametrically opposite said lubricant hole, said counterbalance hole being disposed toward the end of said sleeve from said lubricant hole.

4. A flexible shaft coupling of the self-aligning gear type comprising a pair of complementary shaft end hubs each having a collar with gear teeth on the adjacent ends of said hubs, a one piece cylindrical sleeve having internal gear teeth extending lengthwise over and in engagement with the gear teeth on both said hubs, a sealing ring supported on the end of said sleeve, said sealing ring having an inwardly directed surface slidingly engaging an outwardly directed surface on the ends of said sleeve, said sealing ring having an inwardly directed flange portion terminating adjacent the outside surfaces of said hubs, an O-ring made of flexible material disposed between said inwardly directed flange and said hubs forming sealing engagement therewith, an O-shaped washer making sealing engagement between the outer surface of said sleeve and the inner surface of said sealing ring, means to hold said sealing ring in position on said sleeve, a lubricant hole in said sleeve under said sealing ring, said means to hold said sealing ring in position on said sleeve comprising an internal peripheral groove in said ring and a snap ring in said groove, said snap ring abutting said outwardly directed surface on the end of said surface remote from the nearest end of said shaft.

5. The coupling recited in claim 4 wherein said O-shaped washer making sealing engagement between the outer surface of said sleeve and the inner surface of said sealing ring is disposed on the side of said lubricant hole adjacent said snap ring, when said coupling is in operative position whereby said lubricant hole is covered, closed, and sealed.

6. The coupling recited in claim 5 wherein said lubricant hole is closed by said sealing ring when said sealing ring is in the operative position, said snap ring being adapted to be removed from said sealing ring and said sealing ring slid toward the end of said sleeve whereby said lubricant hole is exposed to allow lubricant to be admitted into said coupling.

7. The coupling recited in claim 6 wherein a hole is formed in said sleeve on the side thereof opposite said lubricant hole, said hole on the opposite side of said sleeve being closed when said sleeve is in the operative position and being open when said sleeve is removed, said second mentioned hole being adapted to allow lubricant to run out of said coupling when said coupling is disposed in a predetermined position of rotation during lubrication and when the lubricant therein reaches a predetermined level.

References Cited in the file of this patent

UNITED STATES PATENTS

| | | |
|---|---|---|
| 2,691,875 | Schmitter | Oct. 19, 1954 |
| 2,831,520 | Clarke | Apr. 22, 1958 |
| 2,871,681 | Beecher | Feb. 3, 1959 |
| 2,899,807 | Schwettman | Aug. 18, 1959 |
| 3,001,385 | Allen | Sept. 26, 1961 |
| 3,045,453 | Shenk et al. | July 24, 1962 |

FOREIGN PATENTS

| | | |
|---|---|---|
| 404,713 | France | Oct. 27, 1909 |
| 1,068,437 | France | Feb. 3, 1954 |